No. 778,360. PATENTED DEC. 27, 1904.
W. S. GRAHAM.
SEEDING MACHINE.
APPLICATION FILED AUG. 29, 1904.
2 SHEETS—SHEET 1.
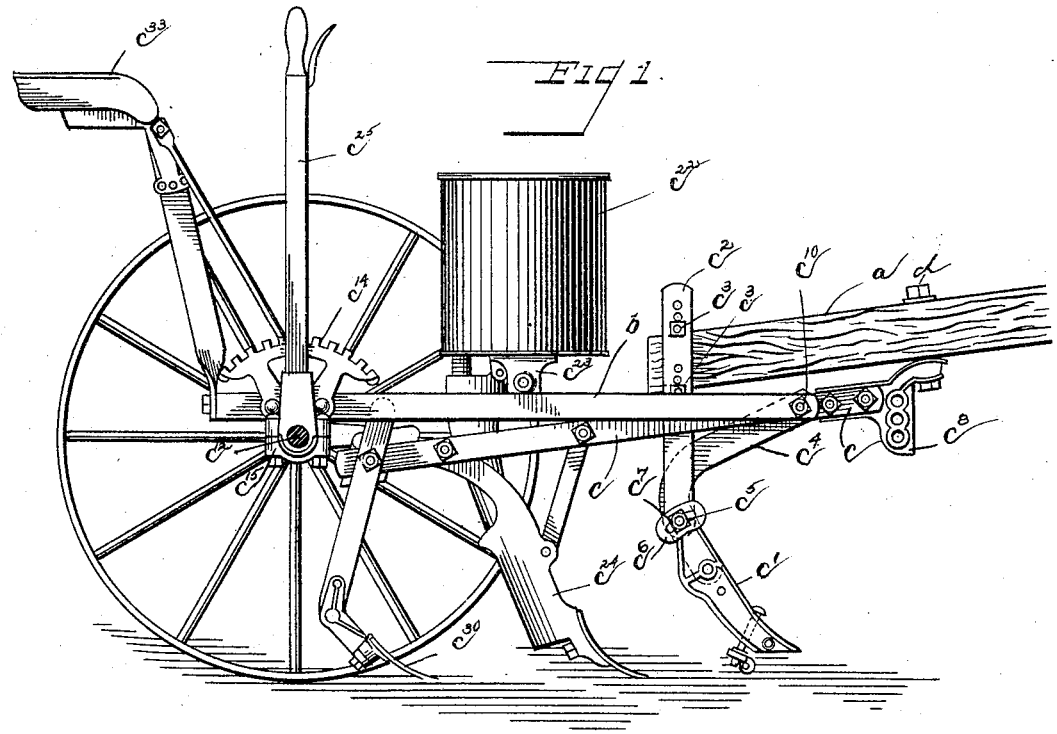
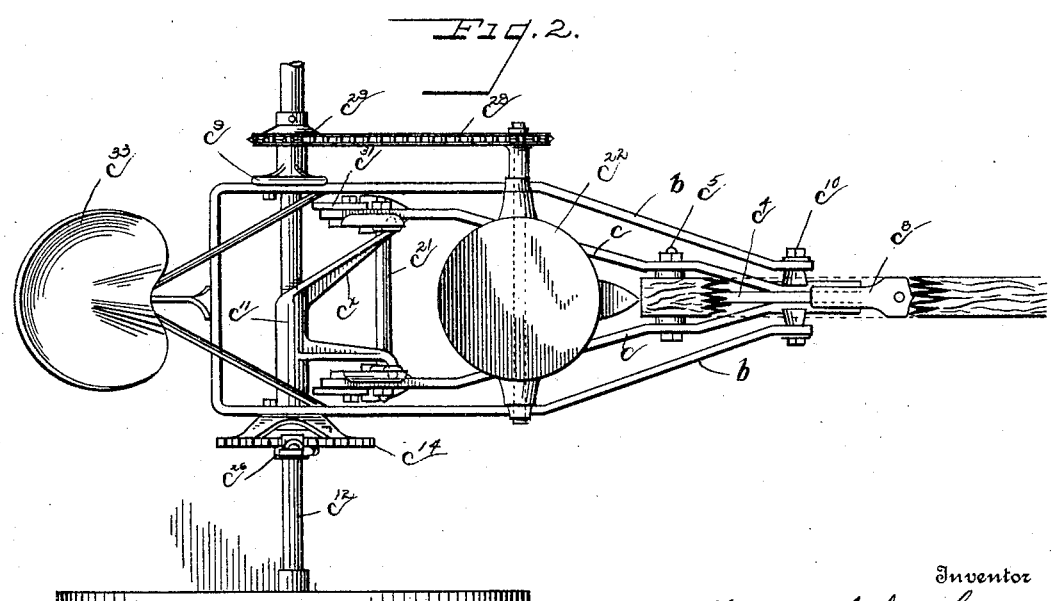
Witnesses
Inventor
William S. Graham
By Staley & Boroman
Attorneys

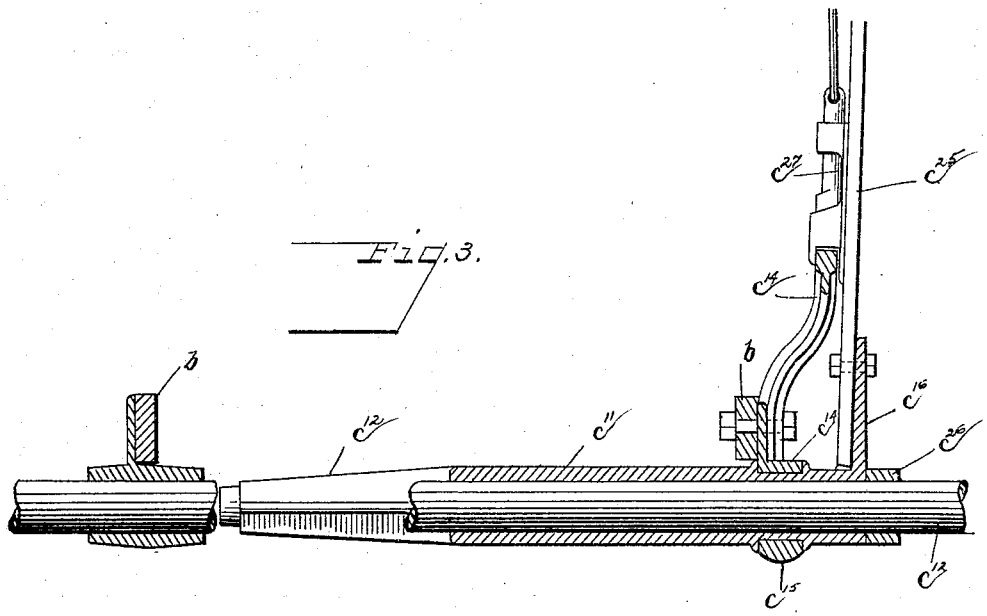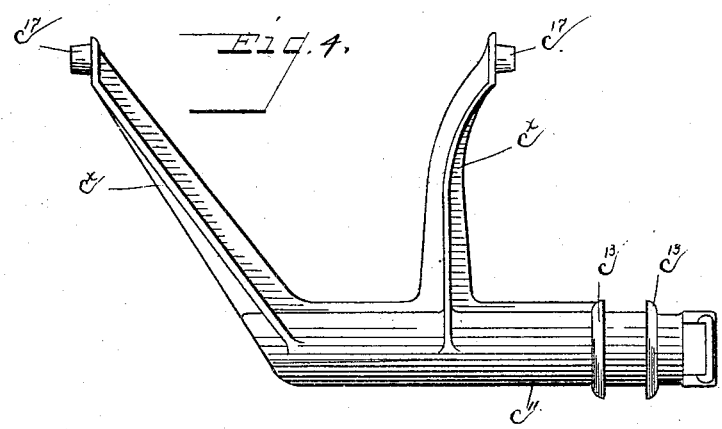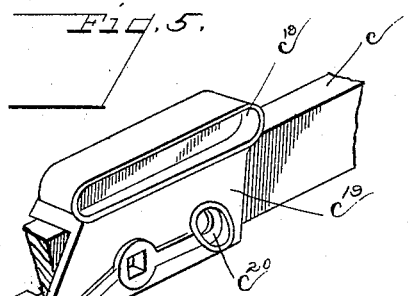

No. 778,360.

Patented December 27, 1904.

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

SEEDING-MACHINE.

SPECIFICATION forming part of Letters Patent No. 778,360, dated December 27, 1904.

Application filed August 29, 1904. Serial No. 222,582.

*To all whom it may concern:*

Be it known that I, WILLIAM S. GRAHAM, a citizen of the United States, residing at Canton, in the county of Fulton and State of Illinois, have invented certain new and useful Improvements in Seeding-Machines, of which the following is a specification.

My improvement relates to seeding-machines, and is particularly adapted to both corn and cotton planter machines.

My object is to construct a corn and cotton planter efficient in operation and strong in construction, having a long main frame, such that a supplemental frame may be raised and lowered with the least possible tipping of the operator's seat, which is supported on the main frame, and with the least possible danger of disarranging the seeding mechanism, as hereinafter more fully explained.

In the drawings, Figure 1 is a side elevation of my machine. Fig. 2 is a plan view. Fig. 3 is a vertical sectional view. Fig. 4 is a detail view of the sleeve and arms for raising and lowering the supplemental frame, and Fig. 5 is a detail view of the plate formed on the supplemental frame containing the bearings for said arms.

Like letters of reference indicate like parts throughout the several views.

The tongue of my machine is indicated by $a$. The main frame is indicated by $b\,b$ and the supplemental frame by $c\,c$.

The main frame $b\,b$ comprises a single U-shaped bar which is pivoted in advance of the sweep $c'$, as shown in Fig. 1. The sweep $c'$ is connected with a standard $c^2$, which extends upwardly and which is supported by the tongue $a$. The standard $c^2$ has a series of perforations, and within these perforations bolts $c^3$ fit, so that the standard can be vertically adjusted by changing the location of the bolts. The standard is pivotally connected at its lower end to a leg $c^4$ by a bolt $c^5$. The shank of the sweep $c'$ is formed with a plate $c^6$, having a slotted opening $c^7$, and the nut of the bolt $c^5$ forms holding means for the adjustment of the sweep $c'$. Consequently the nut and bolt $c^5$ may be loosened and the vertical adjustment of the sweep $c'$ made, and the bolt being tightened the shank of said sweep and the standard-leg are connected by said bolt. The forward ends of the supplemental frame $c$ embrace the sides of a clevis $c^8$ and are connected to said clevis. Said clevis is pivoted to the tongue by a bolt $d$, which permits a limited amount of pivotal movement vertically of said clevis and the supplemental frame, as indicated in Fig. 1. A bolt $c^{10}$, Figs. 1 and 2, extends through the forward ends of the supplemental frame and the leg $c^4$ of the shank $c'$ and through the forward ends of the main frame $b\,b$, and said bolt constitutes a pivot for said main frame and said leg of the sweep. The rear end of the main frame supports a bearing $c^9$ for the carrying-wheel axle $c^{12}$, (see Fig. 2,) and there is journaled loosely upon said axle a sleeve $c^{11}$, which has projecting lifting-arms $c^{\times}$, which constitute the lifting means for the supplemental frame. This sleeve is formed with annular rings $c^{13}$, which engage the side of a toothed segment $c^{14}$ and the sides of a collar $c^{15}$, Fig. 3. The segment $c^{14}$ is bolted to the main frame $b$, and in this way the sleeve is kept from having any lateral movement. Said sleeve $c^{11}$ is formed also with a lever-socket $c^{16}$. The outer ends of the projecting arms $c^{\times}$ are formed with projecting pintles $c^{17}$. These pintles are each adapted to fit within an elongated bearing $c^{18}$, formed in the side of a plate $c^{19}$, which is fitted on the supplemental frame-bar $c$, Fig. 5. There is a plate $c^{19}$ for each supplemental side bar $c$, and these plates are adjustably mounted on said side bar.

A bearing $c^{20}$, Fig. 5, is for the ends of a spreader-rod $c^{21}$, Fig. 2. This spreader-rod $c^{21}$ therefore constitutes a connecting-rod between the two side bars of the supplemental frame. The sleeve $c^{11}$, with its lever-socket $c^{16}$, is so arranged that the lever-socket is located at the extreme right-hand side of the main frame, (looking from the direction of the operator as he sits on the machine,) and the arms $c^{\times}$ project forwardly near the center of the machine and engage and hold the supplemental frame in proper position in its relation to the main frame. The seedbox $c^{22}$ is supported by the main frame of the machine. As indicated in Fig. 1, the seedbox is formed with brackets $c^{23}$, which constitute the supports, and these supports are bolted to the main frame. The usual pipe connection is made from the seedbox to the furrow-opener $c^{24}$. The lifting-lever $c^{25}$, Fig. 3, engages the socket $c^{16}$, and the sleeve $c^{11}$ will be oscillated to cause the arms $c^{x}$ to be oscillated, and thereby raise and lower the supplemental frame by means of the pintles $c^{17}$ within the elongated bearings $c^{18}$, formed in the plates $c^{19}$ upon the supplemental frame. By this construction the supplemental frame is raised and lowered and held in proper position by a very advantageous arrangement, such that the seedbox is located on the main frame and does not in any way interfere with the operation of the lifting device. The sleeve is held upon the axle by a collar $c^{26}$. The lifting-lever is formed with an engaging pawl $c^{27}$, which engages the rack of the segment in the usual manner and forms holding mechanism for holding the supplemental frame in its proper position. It is evident that if for any cause the sweep $c'$ is strained laterally the connections are such that the supplemental frame and the sweep will be held against lateral movement. The feeding mechanism for the planter is operated, through the connection of a sprocket-chain $c^{28}$, with a pinion $c^{29}$, formed on the carrying-wheel axle. The furrow-opener $c^{24}$ and the covering-shovels $c^{30}$ are supported by the supplemental frame in the usual manner, as shown in Fig. 1.

Extensions (indicated by the reference character $c^{31}$) formed on the plate $c^{19}$, Figs. 2 and 5, are for holding the legs of the covering-shovels $c^{30}$ in proper position.

The operator's seat is indicated by $c^{33}$, and same is supported on the main frame.

The operation of my device will be readily understood from the foregoing description of the parts. By means of the clevis $c^{8}$ the horses pull the machine so that the main frame is in direct line with the line of draft and the supplemental frame may be readily raised and lowered by the lifting-lever $c^{25}$, which lever is so arranged that its manipulation is not in any way interfered with by the seedbox, which is carried on the main frame, and the support for same extends across said frame. When a double-moldboard plow is used instead of the ordinary sweep $c'$, there is a great strain on the parts of the machine and there is an increased tendency of objects displacing laterally said moldboard-plow; but in my device when the supplemental frame is raised it is held in proper alinement so that the machine will run true by reason of the lifting-arm $c^{x}$ engaging and holding the rear ends of the supplemental frame.

Having thus described my invention, I claim—

1. In a planter, the combination of a main frame, a supplemental frame, and a sweep, the main frame being pivoted in advance of said sweep and said supplemental frame also pivoted in advance of said sweep, and means connected with the main frame for raising and depressing said supplemental frame, for the purpose specified.

2. In a planter, the combination of a main frame, a sweep, and a supplemental frame, means for pivoting said main frame in advance of the sweep, a seedbox supported on said main frame, and lifting means connected with said main frame for raising and lowering said supplemental frame.

3. In a planter, the combination of a main frame, a supplemental frame within said main frame, a sweep, and a tongue for supporting same, means for pivotally connecting said sweep with said main and supplemental frames, a seedbox supported independently of the supplemental frame, and furrow-openers and covering-shovels supported by the supplemental frame, for the purpose specified.

4. In a planter, the combination of a tongue, a clevis pivoted below said tongue, a supplemental frame connected to said clevis, a sweep, and a main frame pivotally connected to said supplemental frame in advance of said sweep, a seedbox supported by said main frame, and means also connected with said main frame for raising and lowering said supplemental frame, for the purpose specified.

5. In a planter, the combination of a main frame, a sweep, and a supplemental frame within said main frame, a tongue, and means for pivotally connecting said main frame and said supplemental frame to said tongue in advance of said sweep, a lifting-lever connected with said main frame and located at one side thereof, means connected with said lifting-lever located within said supplemental frame and operated by said lever for raising and lowering said supplemental frame.

6. In a planter, the combination of a main frame, a supplemental frame pivotally connected to said main frame, a sweep located rearwardly of said pivotal point, a lifting device comprising a lever and a sleeve, said lever being located at one side of said main frame, and lifter-arms connected with said sleeve located within the main frame and pivotally connected with said supplemental frame, for the purpose specified.

7. In a planter, a tongue, a clevis pivotally connected to said tongue and below same, a main frame, a supplemental frame within said main frame, means for connecting said main frame to said clevis and for pivotally connecting said supplemental frame to said main frame, a seedbox, an operator's seat supported by said main frame, a sweep supported by said tongue and pivotally connected to said main and supplemental frames rearward of the pivotal connection between said main and supplemental frames, furrow-openers and covering-shovels supported by said supplemental frame, and means supported by said main frame for raising and lowering said supplemental frame.

8. In a planter, a main frame and a supplemental frame within said main frame, a lifting device supported by said main frame, and elongated recesses whose major axes are substantially horizontal formed in the supplemental frame with which said lifting device coöperates, shovels supported by said supplemental frame and held in alinement by said lifting devices.

9. In a planter, a main frame and a supplemental frame within said main frame, means comprising projecting lifting-arms supported by said main frame for lifting said supplemental frame, openings formed in the supplemental frame with which said arms engage, and shovels supported by said supplemental frame and held in alinement by said lifting device.

10. In a planter, a main frame, a supplemental frame, a lifting member pivotally supported on said main frame, projecting pintles on said lifting member, flanges on said supplemental frame engaging said projecting pintles on opposite sides, whereby said supplemental frame may be raised and lowered by said lifting member held against lateral movement by said lifting member.

11. In a planter, a main frame, a supplemental frame, a lifting member, interengaging parts on said lifting member and supplemental frame, a sliding connection between said interengaging parts, and means whereby said supplemental frame will be held against movement by said lifting member.

In testimony whereof I have hereunto set my hand this 22d day of August, A. D. 1904.

WILLIAM S. GRAHAM.

Witnesses:
 ADA VOORHEES,
 ALBERT C. LARSON.